United States Patent Office 3,613,454
Patented Oct. 19, 1971

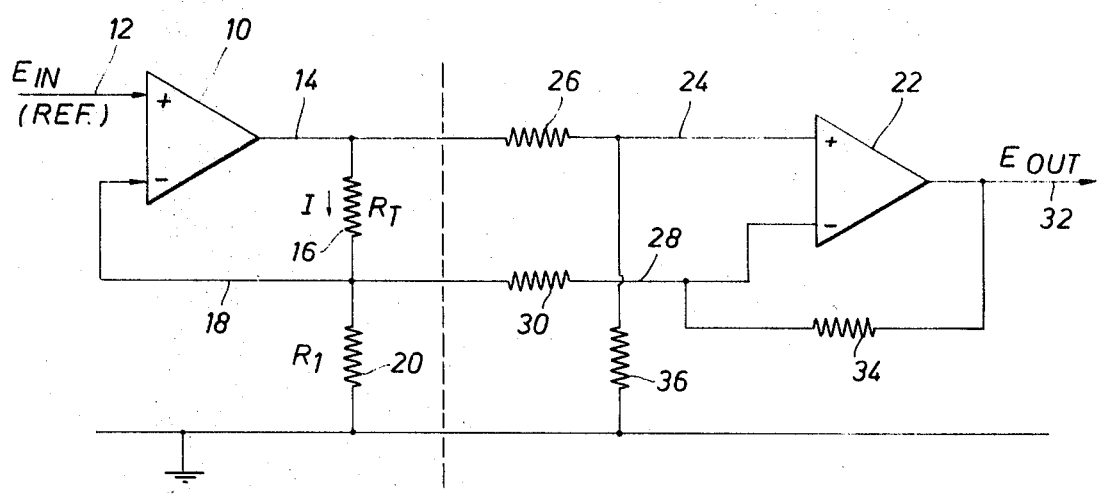

3,613,454
PLATINUM RESISTANCE THERMOMETER CIRCUIT
Louis W. McFadin, Houston, Tex., assignor to the United States of America as represented by the Administrator of the National Aeronautics and Space Administration
Filed Mar. 16, 1970, Ser. No. 19,572
Int. Cl. G01k 7/20
U.S. Cl. 73—362 AR                                                   1 Claim

ABSTRACT OF THE DISCLOSURE

A platinum wire resistor is exposed to a temperature to be measured. The voltage drop across the resistor is input to a differential amplifier. The platinum resistor is connected to ground through a sensing resistor. Variations in voltage across the sensing resistor drives the differential amplifier to maintain a constant current through the resistance thermometer and the sensing resistor. A second differential amplifier connected across the resistive thermometer forms an output signal which is related to the temperature of the sensor and hence, proportional to the measured temperature.

---

This invention described herein was made by an employee of the United States Government and may be manufactured and used by or for the Government of the United States of America for governmental purposes without the payment of any royalties thereon or therefor.

Numerous devices have been advanced heretofore for measuring the temperature and forming an electrical signal proportionate to the temperature. Temperature measuring devices are normally required in process control equipment, and generally instrumentation of all sorts. Apparatus of the prior art has typically included bridge circuits, one leg of the bridge being the exposed temperature responsive element. Such circuits typically require a servo loop driving an indicator, wiper arm, or the like, to null the bridge and indicate the balance in a readable form. These devices are unduly cumbersome, involve operation of substantial portions of mechanical equipment, and their accuracy does not begin to approach the accuracy of the present invention.

While the foregoing sets forth the competitive equipment found in the prior art, the present invention is preferably summarized as including a differential amplifier provided with a voltage reference at one input. The output of the differential amplifier is connected to a platinum wire resistor which is the temperature sensor of the present invention. It is preferably connected to ground through a reference resistor. Connected to the midpoint of the two resistances is the second input for the differential amplifier which tends to maintain a constant current in the platinum resistor. Inasmuch as a constant current is maintained across the platinum resistor, its output voltage is thus proportional to its resistance. Its resistance is proportional to temperature and varies therewith in linear fashion. A second differential amplifier is connected across the platinum resistor and its output signal is representative of the temperature.

Many objects and advantages of the present invention will become more readiy apparent from a consideration of the following written specification and single drawing, which is:

The single drawing is a schematic wiring diagram of the circuit of the present invention.

In the single drawing, the numeral 10 indicates a differential operational amplifier of conventional construction. Typically, the differential amplifier is a transistorized circuit having a gain of perhaps $10^4$–$10^6$ power. It is provided with a reference voltage on the conductor 12 at one input i.e. the non-inverting terminal. The output conductor 14 is communicated with a platinum wire resistor 16 which serves as a sensor for the present invention.

The platinum wire resistor 16 can be placed in a suitable housing, on a long probe, or equipped with such supporting structure and apparatus as might be required to place it in a heated place or otherwise exposed to a temperature. Such details of construction will vary with the application and are believed to be obvious to one skilled in the art. In any case, the resistance 16 has a nominal resistance, perhaps on the order of 1000 ohms or so, and is located at a point exposed to the temperature to be measured. A second lead or conductor 18 is likewise connected to the resistor 16. The lead 18 returns to the second input of the differential amplifier 10 i.e. the inverting terminal of this amplifier. In addition, a reference resistor 20 is connected to ground from the conductor 18. As will be observed in the schematic, the current flow to the differential amplifier through the conductor 18 is negligible, and hence, the current developed through the resistor 16 likewise flows through the resistor 20 to ground. The other components connected to the resistors 16 and 20 have sufficiently high input resistance as to draw a negligible current, and hence, it may be stated that a sufficiently large portion of the current through the resistor 16 flows through the resistor 20 to ground so that linearity of the present invention is not effected by the small currents which flow in other portions of the circuitry.

The numeral 22 indicates an output differential amplifier. One conductor 24 utilizing a series input resistor 26 is connected to one end of the resistor 16. An additional conductor 28 utilizing a series input resistor 30 is connected to the low voltage end of the resistor 16. In effect, the differential amplifier measures the voltage drop across the resistor 16. The drop across the resistor 16 is related to the output of the amplifier 22 on the conductor 32. Additionally, a substantially large feedback resistor 34 is connected around the amplifier 22 to maintain its operation in a linear fashion, and a rather larger resistor 36 is connected to ground from the conductor 24 to equalize the input impedance as viewed from the platinum resistor 16 at both of its output terminals such that the sum of resistances 26 and 36 equals the sum of resistances 30 and 34 and the impedance looking into resistor 26 with respect to ground and the impedance looking into resistor 30 with respect to ground are equalized. That is to say, the loading, however slight, nevertheless remains equal at both conductors connected to the resistor 16.

While the foregoing sets forth the various components which comprise the present invention in its preferred form, and illustrates their connection, the operation of the circuits should be described to illustrate the manner in which the resistor 16 forms an electrical signal which is proportional to the temperature of the sensor 16.

Briefly, a reference voltage input to the differential amplifier 10 forms an output voltage on the conductor 14. Some current flows through the resistor 16. Substantially all this current flows through the resistor 20 to ground. A certain voltage drop across the resistor 20 is established and the voltage level is input to the second input terminal of the differential amplifier 10. Thus, if the current increases in the resistor 16, this increases the positive voltage input to the amplifier 10 and tends to decrease the voltage on the conductor 14. This feedback loop tends to stabilize the current through the resistor 16.

Given the availability of a constant current source driving the resistor 16, the high input impedance resistances 26 and 30 communicate the actual voltage across the resistor 16 through the differential amplifier 22. The output signal on the conductor 32 is directly proportional to the voltage across the resistor 16. The voltage across the resistor 16 is thus a function of the value of the resistor. The value of the resistance is a linear function of temperature change, and hence, the signal on the conductor 32 is directly proportional to the temperature of the resistor 16. Preferably, platinum is used for the resistor 16 to obtain the most linear relationship possible and to utilize material which has a wide operating range.

In the preferred embodiment, the ressitor 20 is perhaps 1000 ohms and the resistances 26 and 30 are perhaps on the order of 100,000 ohms or greater. The resistances 36 and 34 are preferably equal to one another, and can be equal to the resistances 26 and 30 as desired. The entire ciricuit is stable and drift-free, especially if the resistances are temperature stabilized. Some drift of gain of the amplifier 10 is immaterial because the feedback path 18 alters the input signal. The amplifier 22 is drift stabilized by the feedback resistor 34.

The foregoing has set forth the preferred embodiment of the present invention. Many alterations and variations may be adapted. For instance, a great number of specially adapted differential amplifiers are available and may be used in the present invention. Additionally, the resistance 16 may be connected with various support mechanisms and the like to implement temperature measurement in the desired manner.

The terminology and vocabulary adopted hereinabove is applied to the claim which is appended hereto.

What is claimed is:
1. Temperature responsive apparatus comprising:
    a first differential operational amplifier having a non-inverting input terminal, an inverting input terminal and an output terminal;
    a source of stable voltage referenced to ground and coupled to said non-inverting input terminal;
    a temperature sensor in the form of an electrical resistance means having an electrical resistance which varies linearly as a function of its temperature over a temperature range to be sensed by said apparatus, said temperature sensor adapted to be exposed to a temperature to be measured and having one terminal of said electrical resistance means coupled to the output terminal of said amplifier;
    a current sensing resistance means coupled between ground potential and the other terminal of said temperature sensor resistance means and forming a voltage divider therewith;
    constant current source means connected with said sensor for flowing a current therethrough which is essentially constant over said temperature range to permit linear operation of said apparatus, said constant current source means including said first differential amplifier having its output terminal and the inverting input terminal thereof connected across said temperature sensor to provide a feedback path whereby the voltage drop across said current sensing resistance means is a second input to said first differential amplifier; and
    output circuit means responsive to the voltage drop across said temperature sensor for forming a signal proportional to the temperature sensed by said apparatus, said output means comprising a second differential amplifier having inverting and non-inverting input terminals and connected to said temperature sensor whereby the voltage across said sensor is applied across the input terminals of said second differential amplifier, said second differential amplifier being gain stabilized by a feedback resistor coupling the output thereof to its inverting input terminal.

References Cited
UNITED STATES PATENTS

| | | | |
|---|---|---|---|
| 2,359,334 | 10/1944 | Smith | 73—362 |
| 3,163,042 | 12/1964 | O'Sullivan | 73—362 |
| 3,320,533 | 5/1967 | Watter | 324—123 |
| 3,379,973 | 4/1968 | Walton | 73—362 |
| 3,417,619 | 12/1968 | Francis | 73—362 |

LOUIS R. PRINCE, Primary Examiner

D. E. CORR, Assistant Examiner

U.S. Cl. X.R.

324—64